United States Patent [19]

Khoe et al.

[11] Patent Number: 4,610,757
[45] Date of Patent: Sep. 9, 1986

[54] METHOD OF MANUFACTURING A GRATING

[75] Inventors: Giok D. Khoe; Antonius J. A. Nicia, both of Eindhoven, Netherlands

[73] Assignee: U.S. Philips Corporation, New York, N.Y.

[21] Appl. No.: 671,152

[22] Filed: Nov. 13, 1984

[30] Foreign Application Priority Data

Nov. 15, 1983 [NL] Netherlands ..................... 8303906

[51] Int. Cl.⁴ .................. B44C 1/22; C03C 15/00; C03C 25/06
[52] U.S. Cl. ................................. 156/655; 156/653; 156/657; 156/659.1; 350/162.22; 427/93
[58] Field of Search .............. 156/652, 653, 654, 655, 156/656, 657, 659.1, 663, 645; 430/313, 317, 318, 321, 323; 427/38, 39, 93, 94, 95; 350/162.11, 162.15, 162.16, 162.17, 162.2, 162.21, 162.22

[56] References Cited

U.S. PATENT DOCUMENTS 3,542,453 11/1970 Kantor ....................... 156/645 X Primary Examiner—William A. Powell
Attorney, Agent, or Firm—Marc D. Schechter

[57] ABSTRACT

The invention relates to a method of manufacturing an optical grating from a body having a surface which is provided with equidistant grooves. In order to obtain cheap and deformation-resistant gratings, according to the invention a surface of a substrate is provided with a number of layers of substantially equal thicknesses. The etching rates of the layers (in a given etchant) increase substantially proportionally to the number of the layer. A cross-sectional surface of the layers is then exposed to the etchant to form the surface with the grooves.

11 Claims, 3 Drawing Figures

METHOD OF MANUFACTURING A GRATING

BACKGROUND OF THE INVENTION

The invention relates to a method of manufacturing an optical grating. In the method, the starting material has a surface which is provided with equidistant grooves. In one embodiment of the method a metal body is provided with grooves, for example by scratching it with a diamond.

The grooved starting material is then used as a jig to make gratings. For example, the jig may be used to form impressions in a layer of lacquer on a supporting glass plate. The lacquer layer is then covered with a metal layer.

The regularity and the shape of the grooves determine the quality of the grating.

The disadvantages of the known method are, in particular, that the production method is expensive and that the layer of lacquer is vulnerable to damage.

Gratings are generally used in scientific instruments which are not mass produced and in which the cost is a comparatively small factor. The gratings can generally be custom made to the requirements of the instrument. However, when used on a large scale, for example in telecommunicatons, the gratings must be cheap and sturdy.

SUMMARY OF THE INVENTION

One of the objects of the invention is to provide inexpensive and sturdy gratings. The invention is, inter alia, based on the recognition of the fact that gratings having the desired properties are obtained when the grooves are formed by chemical methods.

In the method according to the invention, a surface of a substrate is provided with a number of layers having substantially equal thicknesses. The etching rates of the layers, in a given etchant, increase substantially proportionally to the number of the layer. Thereafter, a cross-sectional surface of the layers is exposed to the etchant to form the surface with the grooves.

The gratings obtained by the method according to the invention are cheap and resistant to deformation. A given groove density on the surface, i.e. the number of grating lines per mm, is also simple to obtain. Furthermore, the so-called blaze angle (i.e. the angle whose tangent is equal to the etching depth of an individual layer divided by the layer thickness) can also be simply adjusted.

The body with the etched surface need not be used as a jig; it may itself be the substrate for a metal layer to be provided thereon.

The individual layer thickness is preferably 1–3 $\mu$m. The etching depth of each individual layer is preferably 0.1–0.3 $\mu$m. The blaze angle is preferably 10°–20°.

The gratings manufactured by the method according to the invention are particularly suitable for use in telecommunications in which data transmission is by optical fibers.

DESCRIPTION OF THE PREFERRED EMBODIMENTS

Figure 2:
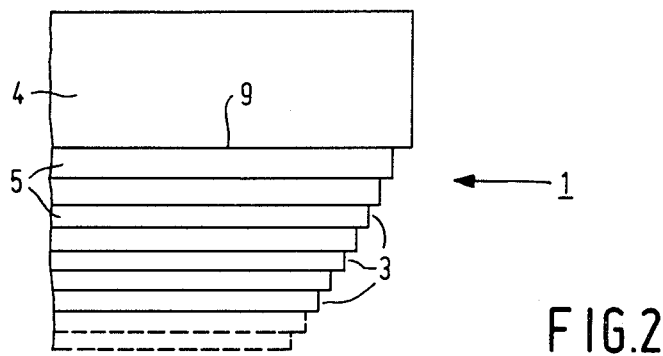
FIG. 2 is an elevational view of a part of a body in a subsequent stage of the manufacture into an optical grating by the method according to the invention.

In the method according to the invention, an optical grating is manufactured by starting with a body 1. A surface 2 of body 1 is provided with equidistant grooves 3. (FIG. 2), as described below.

Figure 1:
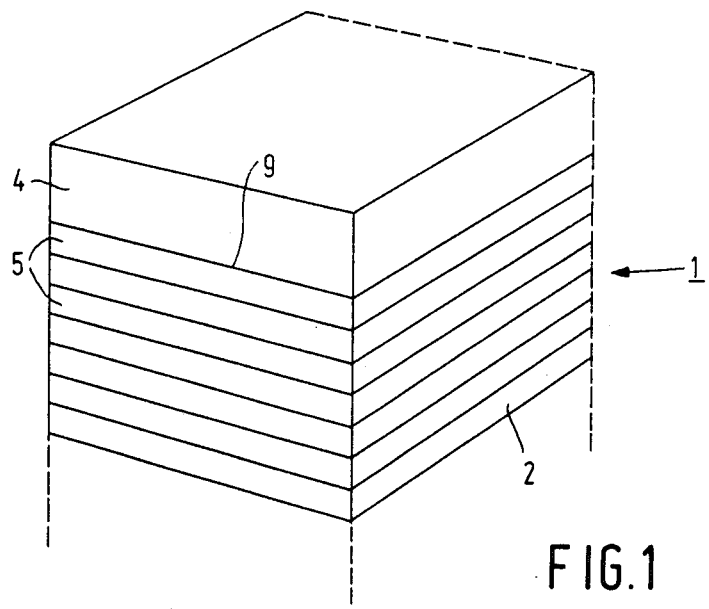
FIG. 1 is a perspective view of a part of a body in a stage of manufacture into an optical grating by the method according to the invention.

According to the invention, a surface 9 (FIG. 1) of a substrate 4 is provided with a number of layers 5 of substantially equal thicknesses. The etching rates of the layers, in a given etchant, increases substantially proportionally to the number of the layer. A cross-sectional etch surface 2 of the layers 5 is then exposed to the etchant to form the grooves 3.

The thickness of each individual layer 5 is preferably 1–3 $\mu$m, and the etching depth of each individual layer is preferably 0.1–0.3 $\mu$m.

Figure 3:
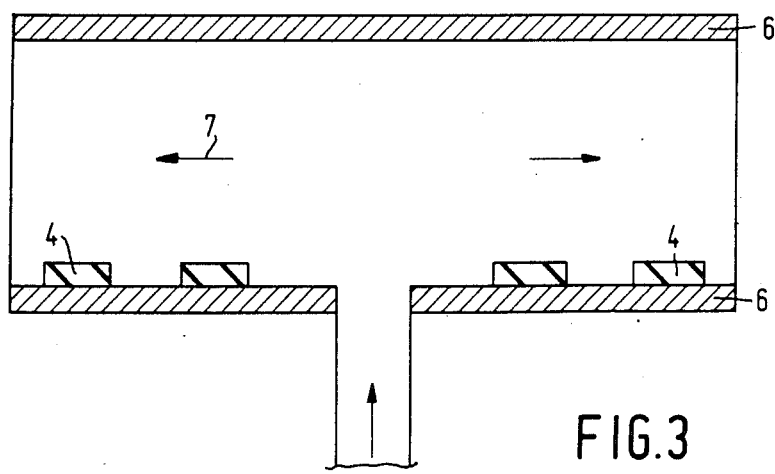
FIG. 3 is a cross-sectional view of a device for performing the method according to the invention.

In manufacturing the grating, one starts with, for example, one or more substrates 4 of quartz glass having a diameter of 20 mm. (FIG. 3.) The substrates 4 are provided in a box-like reactor with capacitively coupled plates 6 between which an RF field having a frequency of 13 MHz is generated.

The layers 5 are deposited on the substrate 4 by a nonisothermal plasma CVD method from a gaseous phase. A nonisothermal plasma CVD method is to be understood to mean herein a method in which a so-called cold plasma is formed in which only electrons have high kinetic energy. By means of such a plasma, gas mixtures can be reacted which are thermally nonreactive. In this method comparatively low substrate temperatures (60°–80° C.) can successfully be used and crack-free layers can be obtained.

During the deposition of the layers 5, the substrates 4 are at a temperature of 60° C. The layers 5 are deposited from a gas flow 7 comprising silane ($SiH_4$), ammonia ($NH_3$), argon (Ar), and stepwise decreasing quantities of dinitrogen oxide ($N_2O$). The composition of the gaseous phase is varied in a usual manner discontinuously and at short intervals in such manner that approximately 4000 layers, each approximately 1 $\mu$m thick, are deposited in a few hours at a pressure of 1–5 Torr. The compositions of the layers vary in substantially equal steps, namely between silicon oxide ($SiO_2$) and silicon nitride ($Si_3N_4$).

The body 1 thus formed may be provided in any usual manner (i.e. by grinding) with a surface 2, for example perpendicular to the layers 5. Thereafter, the body 1 is masked everywhere except for surface 2 against a phosphoric acid etchant. The etching rates of the layers 5 are proportional to the composition of the layers.

The layers 5 are then etched substantially perpendicularly to their thicknesses in order to form the grooves 3. The etching rate difference between two successive layers is comparatively low so that comparatively little rounding-off at the boundaries of successive layers occurs. In a few days, a profile is obtained in which the steps between successive layers is 0.1 $\mu$m and the blaze angle is approximately 10°.

After the grooves are formed, the grooves are coated in any usual manner with a metal layer. The metal layer may consist of gold and may have a thickness of 0.1 $\mu$m. The body can be processed directly to form an optical grating, or it may alternatively be used as a jig to obtain a grooved surface.

The method according to the invention enables the manufacture of inexpensive and sturdy optical gratings for telecommunication purposes.

Of course the invention is not restricted to the example described. The method described above can be varied in many ways by these skilled in the art without departing from the scope of this invention.

What is claimed is:

1. A method of manufacturing an optical grating, said method comprising the steps of:

providing a substrate having a surface;

depositing a number of layers of material on the surface of the substrate, said layers having substantially equal thicknesses, said layers forming a substantially planar etch surface substantially perpendicular to the surface of the substrate and substantially perpendicular to the layers; and etching the planar etch surface with an etchant;

characterized in that each layer of the etch surface is etched by the etchant at a rate which is proportional to the distance of the layer from the substrate so as to form a nonperiodic stepped surface.

2. A method as claimed in claim 1, characterized in that each layer is 1 to 3 microns thick.

3. A method as claimed in claim 2, characterized in that each layer is etched 0.1 to 0.3 microns.

4. A method as claimed in claim 3, characterized in that the grating has a blaze angle of 10° to 20°.

5. A method as claimed in claim 4, characterized in that the layers are deposited by a nonisothermal plasma chemical vapor deposition method.

6. A method as claimed in claim 1, characterized in that each layer is etched 0.1 to 0.3 microns.

7. A method as claimed in claim 6, characterized in that the grating has a blaze angle of 10° to 20°.

8. A method as claimed in claim 7, characterized in that the layers are deposited by a nonisothermal plasma chemical vapor deposition method.

9. A method as claimed in claim 1, characterized in that the grating has a blaze angle of 10° to 20°.

10. A method as claimed in claim 9, characterized in that the layers are deposited by a nonisothermal plasma chemical vapor deposition method.

11. A method as claimed in claim 1, characterized in that the layers are deposited by a nonisothermal plasma chemical vapor deposition method.

* * * * *